Figure 1:
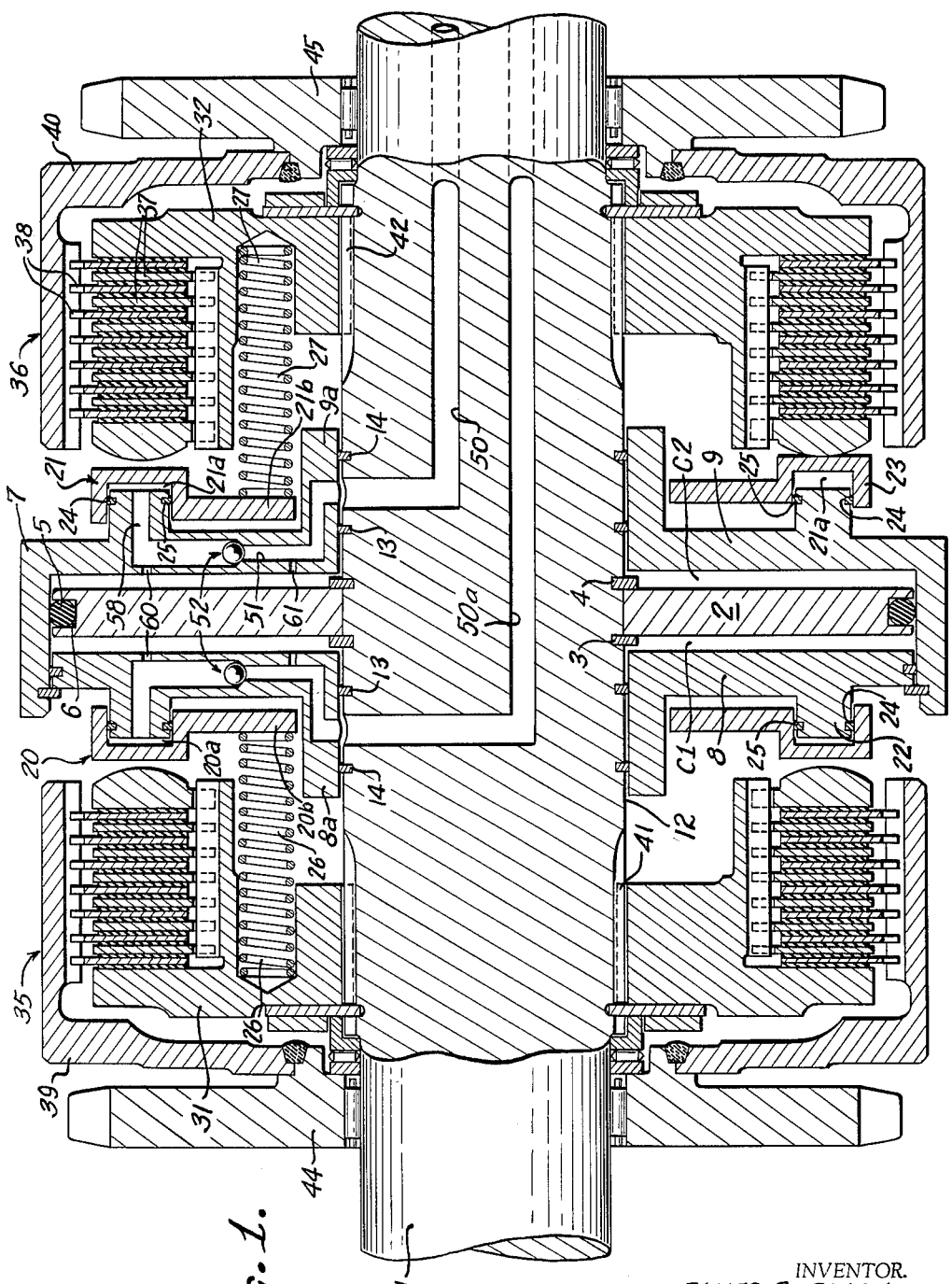

July 26, 1966   J. B. BLACK ET AL   3,262,531
CLUTCH WITH DUAL PISTONS FOR QUICK SLACK TAKE UP
Filed May 28, 1964   2 Sheets-Sheet 1

INVENTOR.
JAMES B. BLACK
CONRAD R. HILPERT
BY
James E. Nilles
ATTORNEY

July 26, 1966  J. B. BLACK ET AL  3,262,531
CLUTCH WITH DUAL PISTONS FOR QUICK SLACK TAKE UP
Filed May 28, 1964  2 Sheets-Sheet 2

INVENTORS.
JAMES B. BLACK
BY CONRAD R. HILPERT

James E. Nilles
ATTORNEY

United States Patent Office 3,262,531
Patented July 26, 1966

3,262,531
CLUTCH WITH DUAL PISTONS FOR QUICK
SLACK TAKE UP
James B. Black and Conrad R. Hilpert, Rockford, Ill.,
assignors to Twin Disc Clutch Company, Racine, Wis.,
a corporation of Wisconsin
Filed May 28, 1964, Ser. No. 370,786
14 Claims. (Cl. 192—87)

The present invention relates to hydraulically operated clutch mechanisms and finds particular but not exclusive utility in clutch mechanisms having a pair of opposed clutches coaxially mounted on a rotating shaft, wherein the clutches are selectively engaged to provide drive through associated gearing or the like.

These prior art devices utilize opposed clutch packs having interleaved clutch plates operable by a piston disposed between the clutch packs. That piston is hydraulically operated and requires complicated and expensive parts and valving arrangements to effect rapid clutch operation. These devices have two opposed piston actuating chambers which are both maintained full of the hydraulic fluid at all times so as to insure immediate and rapid actuation of the mechanism selectively in either direction, and the fluid is transferred at a controlled rate from one chamber to the other in order to accomplish this instantaneous actuation.

With the above arrangement, the volume of oil required from the pressure supply system is held to a minimum in order to obtain this fast action, and as an example of this type of prior art device, reference may be had to U.S. Patent No. 3,106,999, issued October 15, 1963, entitled "Hydraulically Operated Clutch Mechanism," or U.S. Patent No. 2,920,732, issued January 12, 1960, entitled "Double Hydraulic Operated Clutch Device." In the device of either one of the said patents, the oil volume requirements for actuation are reduced, as previously mentioned, by providing for fluid transfer from the contracting chamber to the expanding or actuating chamber, and it is necessary to supply sufficient fluid immediately to move a large area piston, through its full stroke to effect clutch engagement.

While the above devices operate satisfactorily in most respects, they do have certain shortcomings; for example, they require rather complicated parts which are expensive to manufacture, and the various elements of the fluid transfer valves are subject to malfunction due to foreign matter in the fluid, among other reasons. Also in some of these prior devices, fluid flow to the main piston chamber was through and dependent on an orifice which could be adjusted for smooth engagement, but that required the orifice size to be in delicate balance with the elasticity of the various parts, such as, fluid compressibility, variable leakage, and variable viscosity. In addition, the initial and large clutch clamping force of the large area piston often resulted in an engagement which was quite violent and not "soft" or smooth.

Accordingly, the present invention provides a hydraulic operated clutch mechanism in which the clutch has a small primary piston that functions initially to abut against it to take up the friction plate running clearance; a large main piston then provides the clamping force; the small piston is mounted on one side of the main piston and in engagement therewith to form a small fluid chamber with said main piston; located in the main piston are fluid passages which supply fluid to both the large piston chamber and the small piston chamber; a more limited aspect of the invention relates to the difference in total cross sectional area of the passages to the small chamber as compared to that of the passages in communication with the corresponding large chamber. This construction provides that the small piston acts first to take up the clearance in the clutch pack before the large piston applies clamping force. The result is a smoothly operating clutch.

The invention furthermore provides valve means which prevent unrestricted return flow of the fluid from the small chamber, and a hydraulic lock is established in the small chamber which is gradually dissipated as the main piston applies clamping force. The pistons then move together in abutting relationship. This arrangement provides a hydraulic cushion that also contributes to a clutch having "soft" and smooth engaging characteristics.

A more specific aspect of this invention relates to a clutch of the above type in which the said common passage means to the large and small chambers are located in the side wall of the main piston, thereby resulting in a simple mechanism having few parts which are inexpensive to manufacture, yet efficient and reliable in performing the functions for which it was designed.

The present invention, in general, provides a clutch which requires no fluid transfer from one of the main actuating chambers to the other, yet still provides rapid and smooth operating characteristics.

Figure 2:
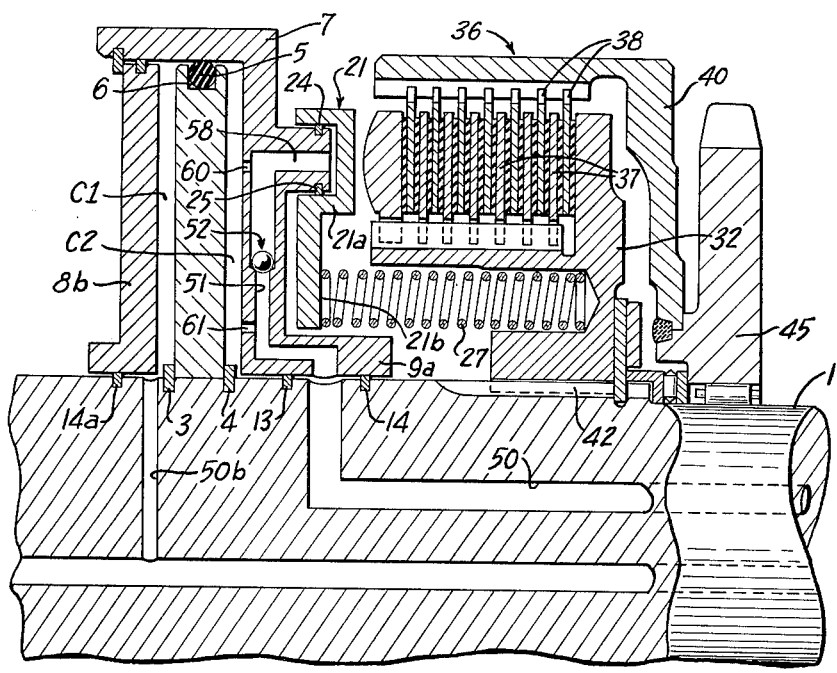

These and other objects and advantages will appear later as this disclosure progresses, reference being had to the following drawings in which:

FIGURE 1 is a longitudinal cross sectional view through a mechanism embodying the present invention; and FIGURE 2 is a view similar to FIGURE 1 but showing a modified form of the invention.

Referring in greater detail to the drawing, the clutch device shown in FIGURE 1 is in the neutral or disengaged position. A shaft 1 which may be driven from a power source (not shown), has an annular reaction member 2 axially fixed thereon by snap rings 3 and 4 and rotatable with the shaft.

A sealing ring 5 is disposed in the groove 6 around the periphery of member 2 and sealingly engages the inner surface of an annular casing which forms a generally annular force piston 7. The reaction member divides the interior of the force piston into a pair of axially spaced fluid chambers C1 and C2.

Main piston

The main force piston 7 at one side has an end wall 8 which terminates at its central portion in an axially extending hub 8a. A similar end wall 9 and its hub 9a are located on the other side of the main force piston 7.

The axially extending hubs 8a and 9a are adapted to reciprocate over the central portion 12 of the shaft and are in sealing relationship with it by means the conventional seals 13 and 14.

Primary pistons

A pair of primary or smaller pistons 20, 21 are axially slidable on axially extending portions 22 and 23 respectively, which portions extend from the side walls of the main piston, and are in fluid sealing engagement therewith by means of the seals 24 and 25. As the pistons 20 and 21 are identical in construction, a description of one is deemed to be sufficient.

Formed between the portions 22 and 23 and their small primary pistons 20, 21 is an expansible fluid chamber 20a, 21a respectively. It should be noted here that chambers 20a and 21a are not completely sealed against fluid leakage because fluid can slowly leak past seals 24 and 25 for purposes that will hereinafter appear.

The primary pistons 20 and 21 also include radially inward extending flanges 20b and 21b which are resiliently held against their adjacent large piston by means of the conventional disengaging springs 26 and 27.

The clutches

Clutches 35, 36 are located on opposite sides of the main force piston 7 and are similar to one another and conventional in nature, having interleaved friction discs 37, 38 splined, respectively, to their hubs 31, 32 and to their drums 39, 40. Hubs 31 and 32 are connected to shaft 1 by the spline connections 41 and 42 for rotation with the shaft. Drums 39 and 40 are rigidly secured to elements to be selectively driven, such as gears 44 and 45 which may be journalled on shaft 1 and connected with other elements to be driven.

Fluid passages and valves

Hydraulic fluid is introduced into the various chambers in the following manner and the operation will be explained in connection with the right hand clutch, it being understood that the structure and operation of the other clutch is similar.

The large chamber C2 and small chamber 21a are kept filled with fluid and purged of air by admitting fluid from passage 50 in the shaft 1, through the passage 51 in the side wall of the piston, through the one-way check ball valve 52. Another passage 50a is provided in shaft 1 for furnishing fluid to chambers C1 and 20a.

Also formed in the wall 9 of the main piston is an axial fluid feed hole 58 which places passage 51 in communication with its small chamber 21a. The main chamber C2 is in fluid communication with radially extending passage 51 at two locations, one through hole 60 on the downstream side of check valve 52, and also through hole 61 on the upstream side of check valve 52. Orifice 61 is appreciably larger in cross section than orifice 60 for reasons which will presently appear.

Also, it should be noted that the cross-sectional area of axial feed hole 58 leading to the primary piston chamber 21a is greater than the total cross-sectional area of axial feed holes 60 and 61 which lead to the main chamber C2. This provides greater restriction of fluid flow to the large chamber C2 than to its smaller primary piston chamber 21a.

With the above arrangement, both the small, primary piston chambers and the main piston chambers are maintained full of fluid from the pressure fluid passages. The one-way check valve prevents unrestricted return flow of fluid from the small chamber, and the fluid is not transferred back and forth from one main chamber C1 to the other main chamber C2.

Furthermore, the above fluid passages in the side wall of the main piston cause the clutch apply fluid pressure to enter the small chamber and pressurize it before the adjacent large chamber in the main piston is pressurized. By this means, the small piston is first urged into contact with the clutch plates and running clearance thus taken up in the clutch before the main piston applies pressure. This action contributes to a smooth operation, as will now be more fully described.

The present clutch is engaged quickly and consumes only a small volume of fluid and operates as follows. Supply pressure fluid enters passage 50, flows past check valve 52, and enters chamber 21a, filling it quickly and forcing primary piston 21 against the clutch plates. Chamber 21a is then at supply pressure. Immediately thereafter, chamber C2 reaches supply pressure, and then the pressure in chamber 21a increases to a value considerably above supply pressure, under some design circumstances reaching a pressure inversely as the area of the primary piston to the area of the main piston. In order to accomplish this, the fluid leakage out of chamber 21a must be quite low in order that very small pressure drop occurs across orifice 61. Therefore, as previously indicated, orifice 61 is appreciably larger in cross section than orifice 60.

Piston 7 will gradually move to the right until it mechanically bears against piston 21, at which time the pressure in piston 21 will drop to the apply pressure of the system.

Fluid pressure release is through holes 61.

Figure 2

This modified form shows the invention as embodied in a single clutch mechanism, but the operation of this single clutch is similar to a clutch of the FIGURE 1 device. Similar elements in the two views have been indicated with like references.

The wall 8b of the main piston slides over the seal 14a. A passage 50b in the shaft communicates with and maintains chamber C1 filled with fluid at lube pressure. The construction and operation of this modification are otherwise the same as the FIGURE 1 mechanism.

Résumé

With the clutch mechanism provided by the present invention, no transfer of oil between the main actuating chambers C1 and C2 is necessary, and a considerable number of complicated and expensive parts are not required as they were in certain of the prior art devices. Nevertheless, the volume of fluid required is held to a minimum, and fast action is not sacrificed.

The small volume, primary piston is used to take up the friction plate running clearance, and a large area piston provides the clamping force. As a result, it is not necessary to supply sufficient fluid immediately to move the large area piston through its full stroke, but instead the fluid volume requirements are determined by the small piston and the pressure requirements of the large piston are satisfied by very small fluid flow rates.

The differential in cross-sectional area between the passages leading to the small chamber and to the corresponding large chamber insures proper sequence of operation of the pistons.

The present clutch is simple, economical to manufacture, and reliable and smooth in operation.

Various modes of carrying out the invention are contemplated as being within the scope of the following claims particularly pointing out and distinctly claiming the subject matter which is regarded as the invention.

What is claimed is:

1. A hydraulically operated clutch mechanism comprising a pair of clutches having a common shaft, a main piston shiftable on the outside of and surrounding said shaft and located between said clutches, an annular reaction member within and enclosed by said main piston and fixed on said shaft to define a pair of large, variable volume, pressure fluid chambers, a pair of primary pistons mounted on the outside of said main piston and one on each side of said main piston and slidably engageable therewith to define a pair of small variable volume chambers, each of said primary pistons being engageable with its respective clutch, and passage means in said main piston for supplying fluid to both of said large and small chambers, and valve means to prevent return flow of said fluid.

2. A hydraulically operated clutch mechanism comprising a pair of clutches having a common shaft, a main piston shiftable on the shaft between said clutches, an annular reaction member within said main piston and fixed on said shaft to define a pair of large, variable volume, pressure fluid chambers, a pair of primary pistons mounted on the outside of said main piston and one on each side of said main piston and slidably engageable therewith to define a pair of small variable volume chambers, each of said primary pistons being engageable with its respective clutch, and passage means in said main piston for supplying fluid to both of said large and small chambers, the total cross sectional area of that portion of said passage means which is in communication with said small chamber being greater than the total cross sectional area of that portion of said passage means which is in communication with the corresponding large chamber, and one-way check valve means in said passage means to prevent unrestricted return flow of said fluid from said small chamber.

3. A hydraulically operated clutch mechanism comprising a pair of clutches having a common shaft, an annular and hollow main piston having a pair of axially spaced end walls, said main piston being shiftable on the outside of and surrounding said shaft and located between said clutches, an annular reaction member within and enclosed by said main piston and fixed on said shaft to define a pair of large, variable volume, pressure fluid chambers, a pair of primary pistons mounted on the outside of said main piston and one on each side of said main piston and slidably engageable therewith to define a pair of small variable volume chambers, each of said primary pistons being engageable with its respective clutch, and fluid supply passage means in each of said end walls of said main piston and communicating with both the large and the small chamber adjacent to its respective end walls, and valve means in said passage means to prevent unrestricted return flow of said fluid from said small chambers.

4. A hydraulically operated clutch mechanism comprising a pair of clutches having a common shaft, an annular and hollow main piston having a pair of axially spaced end walls, said main piston being shiftable on the shaft between said clutches, an annular reaction member within said main piston and fixed on said shaft to define a pair of large, variable volume, pressure fluid chambers, a pair of primary pistons mounted on the outside of said main piston and one on each side of said main piston and slidably engageable therewith to define a pair of small variable volume chambers, each of said primary pistons being engageable with its respective clutch, and fluid supply passage means in each of said end walls of said main piston and communicating with both the large and the small chamber adjacent to its respective end wall, the total cross sectional area of that portion of said passage means which is in communication with said small chamber being greater than the total cross sectional area of that portion of said passage means which is in communication with the corresponding large chamber, and valve means to prevent unrestricted return flow of said fluid.

5. A hydraulically operated clutch mechanism comprising a pair of clutches having a common shaft, a main force piston shiftable on the outside of and surrounding said shaft and located between said clutches, an annular reaction member within and enclosed by said force piston and fixed on said shaft to define a pair of large, variable volume, pressure fluid chambers, a pair of primary pistons mounted on the outside of said main piston and one on each side of said main piston and slidably engageable therewith to define a pair of small variable volume chambers, each of said primary pistons being engageable with its respective clutch, passage means in said main piston for supplying pressure fluid to said large and small chambers, one-way check valve means adjacent said small chamber to prevent return flow of fluid therefrom, whereby pressure fluid enters said chambers to first cause one of said primary pistons to take up the clutch running clearance of its clutch and then cause said main piston to move towards said one primary piston to cause a decaying of the hydraulic lock in its small chamber, after which said main piston abuts against said primary piston and applies clamping force on said clutch.

6. Mechanism as defined in claim 5 further characterized in that the total cross sectional area of that portion of said passage means in communication with said small chamber being greater than the total cross sectional area of that portion of said passage means which is in communication with the corresponding large chamber, said one-way check valve means being in said passage means to prevent unrestricted return flow from said small chamber.

7. A hydraulically operated clutch mechanism comprising a pair of clutches having a common shaft, a main force piston shiftable on the shaft between said clutches, said main piston being hollow and of annular shape and having a pair of axially spaced end walls, an annular reaction member within said force piston and fixed on said shaft to define a pair of large, variable volume, pressure fluid chambers, a pair of primary pistons mounted on the outside of said main piston and one on each side of said main piston and slidably engageable therewith to define a pair of small variable volume chambers, each of said primary pistons being engageable with its respective clutch, a pressure fluid port in said shaft, passage means in said walls of said main piston and in communication with said port in said shaft for supplying fluid to both of said large and small chambers, the total cross sectional area of that portion of said passage means in communication with said small chamber being greater than the total cross sectional area of that portion of said passage means which is in communication with the corresponding large chamber, and one-way check valve means in said passage means to prevent unrestricted return flow from said small chamber.

8. A hydraulically operated clutch mechanism comprising a clutch mounted on a shaft, a main piston shiftable on the outside of and surrounding said shaft, an annular reaction member within and enclosed by said main piston and fixed on siad shaft to define a pair of large, variable volume, pressure fluid chambers, a primary piston mounted on the outside of said main piston and slidably engageable therewith to define a small variable volume chamber, said primary piston being engageable with its clutch, and passage means in said main piston for supplying fluid to both of said large and small chambers, and valve means to prevent return flow of said fluid.

9. A hydraulically operated clutch mechanism comprising a clutch mounted on a shaft, a main piston shiftable on the shaft; an annular reaction member within said main piston and fixed on said shaft to define a pair of large, variable volume, pressure fluid chambers; a primary piston mounted on the outside of said main piston and slidably engageable therewith to define a small variable volume chamber, said primary piston being engageable with its clutch, and passage means in said means piston for supplying fluid to both of said large and small chambers, the total cross sectional area of that portion of said passage means which is in communication with said small chamber being greater than the total cross sectional area of that portion of said passage means which is in communication with the corresponding large chamber, and one-way check valve means in said passage means to prevent unrestricted return flow of said fluid from said small chamber.

10. A hydraulically operated clutch mechanism comprising a clutch mounted on a shaft, an annular and hollow main piston having a pair of axially spaced end walls, said main piston being shiftable on the outside of and surrounding said shaft; an annular reaction member within and enclosed by said main piston and fixed on said shaft to define a pair of large, variable volume, pressure fluid chambers; a primary piston mounted on the outside of said main piston and slidably engageable therewith to define a small variable volume chamber, said primary piston being engageable with its clutch, and fluid supply passage means in one of said end walls of said main piston and communicating with both the large and the small chamber adjacent thereto, and valve means in said passage means to prevent unrestricted return flow of said fluid from said small chamber.

11. A hydraulically operated clutch mechanism comprising a clutch mounted on a shaft, an annular and hollow main piston having a pair of axially spaced end walls, said main piston being shiftable on the shaft; an annular reaction member within said main piston and fixed on said shaft to define a pair of large, variable volume, pressure fluid chambers; a primary piston mounted on the outside of said main piston and slidably engageable therewith to define a small variable volume chamber, said primary piston being engageable with its clutch, and fluid supply passage means in one of said end walls of said main piston and communicating with both the large and the small chamber adjacent thereto, the total cross sectional area of that portion of said passage means which is in communication with said small chamber being greater than the total cross sectional area of that portion of said passage means which is in communication with the corresponding large chamber, and valve means to prevent unrestricted return flow of said fluid.

12. A hydraulically operated clutch mechanism comprising a clutch mounted on a shaft, a main force piston shiftable on the outside of and surrounding said shaft, an annular reaction member within and enclosed by said force piston and fixed on said shaft to define a pair of large, variable volume, pressure fluid chambers, a primary piston mounted on the outside of said main piston and slidably engageable therewith to define a small variable volume chamber, said primary piston being engageable with its clutch, passage means in said main piston for supplying pressure fluid to said large and small chambers, one-way check valve means adjacent said small chamber to prevent return flow of fluid therefrom, whereby pressure fluid enters said chambers to first cause said primary piston to take up the clutch running clearance of its clutch and then cause said main piston to move toward said primary piston to cause a decaying of the hydraulic lock in its small chamber, after which said main piston abuts against said primary piston and applies clamping force on said clutch.

13. Mechanism as defined in claim 12 further characterized in that the total cross sectional area of that portion of said passage means in communication with said small chamber being greater than the total cross sectional area of that portion of said passage means which is in communication with the corresponding large chamber, said one-way check valve means being in said passage means to prevent unrestricted return flow from said small chamber.

14. A hydraulically operated clutch mechanism comprising a clutch mounted on a shaft, a main force piston shiftable on the shaft, said main piston being hollow and of annular shape and having a pair of axially spaced end walls, an annular reaction member within said force piston and fixed on said shaft to define a pair of large, variable volume, pressure fluid chambers, a primary piston mounted on the outside of said main piston and slidably engageable therewith to define a small variable volume chamber, said primary piston being engageable with its clutch, a pressure fluid port in said shaft, passage means in one of said walls of said main piston and in communication with said port in said shaft for supplying fluid to both of said large and small chambers, the total cross sectional area of that portion of said passage means in communication with said small chamber being greater than the total cross sectional area of that portion of said passage means which is in communication with the corresponding large chamber, and one-way check valve means in said passage means to prevent unrestricted return flow from said small chamber.

References Cited by the Examiner

UNITED STATES PATENTS

| | | | |
|---|---|---|---|
| 2,386,220 | 10/1945 | Lawler et al. | 192—85 X |
| 2,638,750 | 5/1953 | Hettinger | 188—196 |
| 3,032,157 | 5/1962 | Richards | 192—87 |
| 3,199,648 | 8/1965 | Schwab | 192—109 X |

DAVID J. WILLIAMOWSKY, *Primary Examiner.*

DON A. WAITE, *Examiner.*

B. W. WYCHE, *Assistant Examiner.*